United States Patent

May et al.

(10) Patent No.: US 9,515,964 B2
(45) Date of Patent: *Dec. 6, 2016

(54) SYNCHRONIZING OUT-OF-SYNC ELEMENTS IN A DISTRIBUTED FIBRE CHANNEL FORWARDER

(71) Applicant: International Business Machines Corporation, Armonk, NY (US)

(72) Inventors: Henry J. May, Cedar Falls, IA (US); Christoph Raisch, Gerlingen (DE); Stefan Roscher, Stuttgart (DE); Daniel Sentler, Steinenbronn (DE); Bharath B. Somayaji, Bangalore (IN); Sudheer R. Yelanduru, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 17 days.

This patent is subject to a terminal disclaimer.

(21) Appl. No.: 14/276,581

(22) Filed: May 13, 2014

(65) Prior Publication Data

US 2015/0312173 A1    Oct. 29, 2015

Related U.S. Application Data

(63) Continuation of application No. 14/264,681, filed on Apr. 29, 2014.

(51) Int. Cl.
*H04L 12/433* (2006.01)
*H04L 12/931* (2013.01)
(Continued)

(52) U.S. Cl.
CPC ........... *H04L 49/357* (2013.01); *H04J 3/0697* (2013.01); *H04L 7/0016* (2013.01); *H04L 12/56* (2013.01);
(Continued)

(58) Field of Classification Search
CPC ..................................................... H04L 49/357
See application file for complete search history.

(56) References Cited

U.S. PATENT DOCUMENTS 8,489,763 B2      7/2013   Armstrong et al.
8,923,277 B1 *   12/2014   Shekhar ................. H04L 49/10
                                                               370/352
(Continued)

FOREIGN PATENT DOCUMENTS

WO      2012120557 A1    9/2012
WO      2012149504 A1   11/2012

OTHER PUBLICATIONS

Claudio DeSanti, "Distributed FCF", T11/11-026v0, Feb. 2010, 1 page.

(Continued)

*Primary Examiner* — Benjamin Lamont
(74) *Attorney, Agent, or Firm* — Patterson + Sheridan, LLP (57) ABSTRACT

Techniques are provided for synchronizing, in a distributed Fiber Channel fabric or a distributed FCoE fabric in which FC frames are encapsulated in Ethernet frames, a controlling FCoE forwarder (cFCF) with the FCoE data-plane forwarder (FDF). The operation includes entering a recovery mode at the FDF. The FDF is modified based on a route distribution message provided by the cFCF which includes fabric-provided MAC addresses (FPMAs). The FDF notifies the cFCF of differences between the FPMAs supplied by the route distribution message with the FPMAs known by the FDF. The FDF leaves the recovery mode and sends an acknowledgement to the cFCF.

9 Claims, 4 Drawing Sheets

(51) Int. Cl.
*H04L 12/54* (2013.01)
*H04L 12/935* (2013.01)
*H04L 7/00* (2006.01)
*H04J 3/06* (2006.01)
*H04L 12/24* (2006.01)
*H04L 12/939* (2013.01)

(52) U.S. Cl.
CPC ....... *H04L 41/0668* (2013.01); *H04L 41/0803* (2013.01); *H04L 49/3009* (2013.01); *H04L 49/557* (2013.01)

(56) References Cited

U.S. PATENT DOCUMENTS

| | | | | |
|---|---|---|---|---|
| 8,948,176 | B1* | 2/2015 | Desanti | H04L 45/44 370/351 |
| 9,055,000 | B1* | 6/2015 | Ghosh | H04L 45/66 |
| 2012/0106957 | A1* | 5/2012 | Willeke | H04L 29/12207 398/58 |
| 2012/0207177 | A1* | 8/2012 | Sharma | H04L 12/2602 370/419 |
| 2012/0254554 | A1 | 10/2012 | Nakajima | |
| 2012/0275467 | A1* | 11/2012 | Xiong | H04L 49/357 370/419 |
| 2012/0308232 | A1 | 12/2012 | Eisenhauer et al. | |
| 2013/0028135 | A1 | 1/2013 | Berman | |
| 2013/0163607 | A1* | 6/2013 | Shukla | H04L 67/1097 370/419 |
| 2013/0287389 | A1 | 10/2013 | Ayandeh | |
| 2014/0029609 | A1 | 1/2014 | Ayandeh | |
| 2014/0029623 | A1* | 1/2014 | Hernandez | H04L 61/103 370/395.53 |
| 2014/0064056 | A1* | 3/2014 | Sakata | H04L 41/00 370/216 |

OTHER PUBLICATIONS

DeSanti, Claudio, et al., Distributed FCF, T11 /11-026v3, Oct. 2011, pp. 1-11 (available at http://www.t11.org/ftp/t11 /pub/fc/bb-6/11-026v3.pdf).

International Business Machines Corporation, "List of IBM Patents or Patent Applications Treated as Related," Jul. 14, 2016, 2 pages.

* cited by examiner

SYNCHRONIZING OUT-OF-SYNC ELEMENTS IN A DISTRIBUTED FIBRE CHANNEL FORWARDER

CROSS-REFERENCE TO RELATED APPLICATIONS

This application is a continuation of co-pending U.S. patent application Ser. No. 14/264,681, filed Apr. 29, 2014. The aforementioned related patent application is herein incorporated by reference in its entirety.

BACKGROUND

Embodiments of the present disclosure generally relate to the field of computer networks.

Computer systems often use multiple computers that are coupled together in a common chassis. The computers may be separate servers that are coupled by a common backbone within the chassis. Each server is a pluggable board that includes at least one processor, an on-board memory, and an Input/Output (I/O) interface. Further, the servers may be connected to a switch to expand the capabilities of the servers. For example, the switch may permit the servers to access additional Ethernet networks or Peripheral Component Interconnect Express (PCIe) slots as well as permit communication between servers in the same or different chassis. In addition, multiple switches may also be combined to create a distributed network switch.

Fibre Channel (FC) can be used to connect these servers and computing resources, including connecting computer systems to storage devices such as storage area network (SAN) devices. Fibre Channel is a high speed medium primarily used for data transfer and storage, but may also be used to connect other devices, servers, printers, etc. Fibre Channel is essentially a serial data channel, often created over fiber optic cabling, that provides a logical bi-directional, point-to-point connection between a host and a device.

BRIEF SUMMARY

Embodiments of the present disclosure provide a method, product, and system for synchronizing, a distributed Fibre Channel fabric or a distributed Fibre Channel over Ethernet (FCoE) fabric in which FC frames are encapsulated in Ethernet frames, a controlling FCoE forwarder (cFCF) with the FCoE data-plane forwarder (FDF). The operation includes entering a recovery mode at the FDF. The FDF is modified based on a route distribution message provided by the cFCF which includes fabric-provided MAC addresses (FPMAs). The FDF notifies the cFCF of differences between the FPMAs supplied by the route distribution message with the FPMAs known by the FDF. The FDF leaves the recovery mode and sends an acknowledgement to the cFCF.

BRIEF DESCRIPTION OF THE SEVERAL VIEWS OF THE DRAWINGS

So that the manner in which the above recited aspects are attained and can be understood in detail, a more particular description of embodiments of the present disclosure, briefly summarized above, may be had by reference to the appended drawings.

It is to be noted, however, that the appended drawings illustrate only typical embodiments of this present disclosure and are therefore not to be considered limiting of its scope, for the present disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

Devices may be connected on Fibre Channel systems using various interconnection topologies and devices, such as switches, hubs, and bridges, to allow scalability based on users' needs. As Fibre Channel networks get larger and network demands increase, switching may be implemented. A switched Fibre Channel network is referred to herein as a "fabric." A fabric is simply the underlying switching architecture used by a Fibre Channel switch. A fabric may contain many loops interconnected with switches.

Fibre Channel over Ethernet (FCoE) refers to a technology used for transporting Fibre Channel (FC) frames over Ethernet, which is standardized at the Technical Committee for Fibre Channel (T11) of the International Committee for Information Technology Standards (INCITS). The transported FC frames used are based on FC architecture for storage networking purposes. The FC-BB-6 and FC-SW-6 working groups of the T11 Fibre Channel standards committee are working to develop a distributed switch model with associated protocols. In conjunction with the technology used for transporting FC frames over Ethernet, a distributed switch model and associated protocols of the current state of the art may be applied to both FCoE switches or standard FC switches.

A distributed FCF comprises at least one control plane element, controlling Fibre Channel Forwarder (cFCF), and one or more data plane elements, referred to as a Fibre Channel over Ethernet (FCoE) data forwarders (FDFs). The cFCF and the FDFs need to be in sync at all times for the distributed FCoE Forwarder (FCF) to operate properly. For multiple reasons, the cFCF and one or more FDFs could go out of sync during the operation of the distributed FCF.

Currently, the only way to bring an out-of-sync FDF in sync with a cFCF is to reset the virtual link between the FDF and cFCF, or restart the FDF. However, this technique results in all ENodes attached to that FDF logging out of the fabric and is disruptive and inefficient.

Accordingly, the illustrated embodiments provide mechanisms for a cFCF and a FDF to enter into a recovery mode of a reset state. During the reset state, the FDF does not allow login changes triggered by an ENode. The cFCF transmits Fibre Channel Switch Fabric 6 (SW-6) commands, e.g. DFMD, NPRD, AZAD, to bring the FDF in sync with the cFCF. A VN_Port Unreachability Notification (VNUN) is sent to the cFCF by the FDF to clear missing ports.

In the following, reference is made to embodiments of the disclosure. However, it should be understood that the disclosure is not limited to specific described embodiments. Instead, any combination of the following features and elements, whether related to different embodiments or not, is contemplated to implement and practice aspects of the present disclosure. Furthermore, although embodiments of the present disclosure may achieve advantages over other possible solutions and/or over the prior art, whether or not a particular advantage is achieved by a given embodiment is not limiting of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Figure 1:
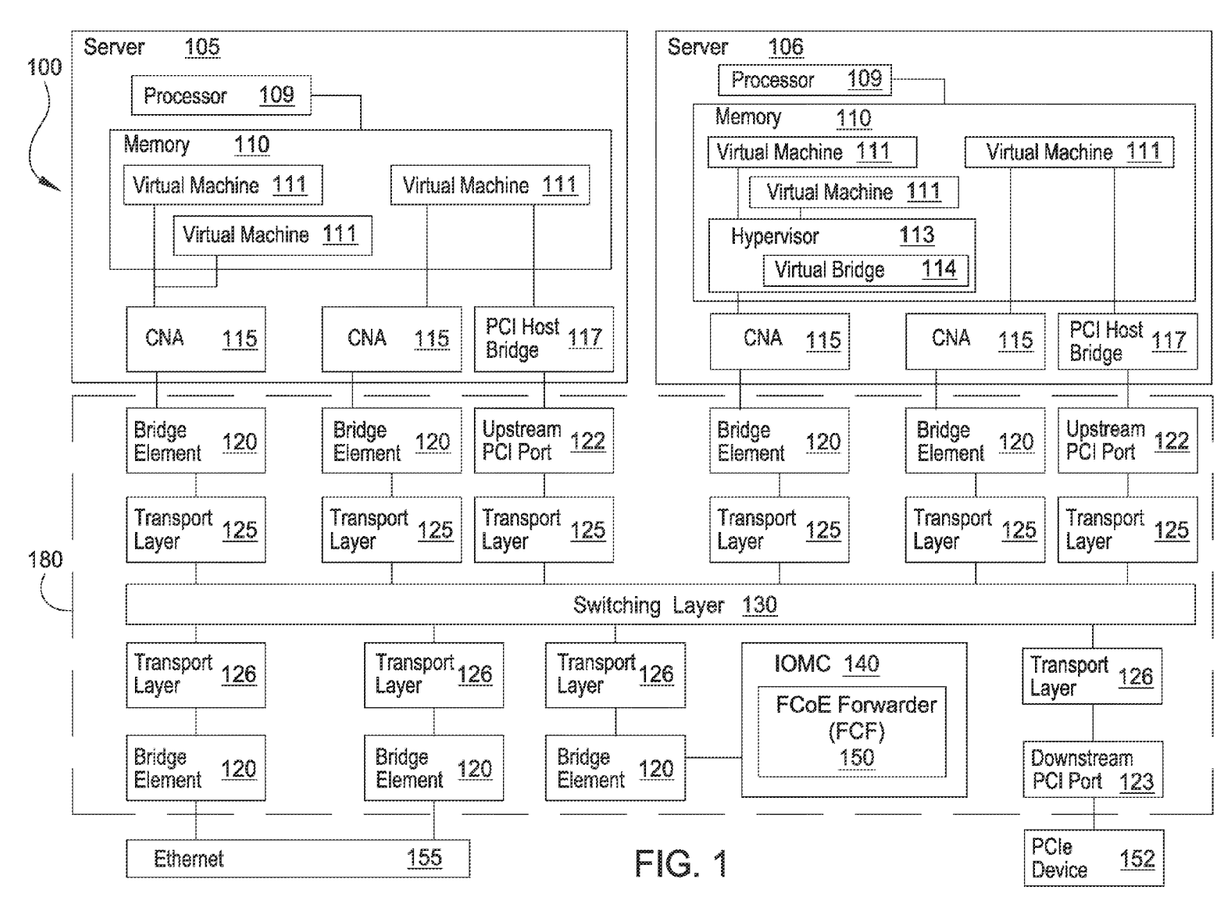
FIG. 1 illustrates a system architecture that includes a distributed network switch, according to one embodiment of the present disclosure.

FIG. 1 illustrates a system architecture 100 that includes a distributed network switch 180, according to one embodiment of the present disclosure. The system architecture 100 includes first and second servers 105, 106 connected to the distributed network switch 180. In one embodiment, the first server 105 may include at least one processor 109 coupled to a memory 110. The processor 109 may represent one or more processors (e.g., microprocessors) or multi-core processors. The memory 110 may represent random access memory (RAM) devices comprising the main storage of the server 105, as well as supplemental levels of memory, e.g., cache memories, non-volatile or backup memories (e.g., programmable or flash memories), read-only memories, and the like. In addition, the memory 110 may include memory storage physically located in the server 105 or on another computing device coupled to the server 105. The server 105 may operate under the control of an operating system (not shown) and execute various computer software applications, components, programs, objects, modules, and data structures, such as virtual machines 111.

The server 105 may include network adapters 115, sometimes referred to as converged network adapters (CNAs). A converged network adapter may include single root I/O virtualization (SR-IOV) adapters such as a Peripheral Component Interconnect Express (PCIe) adapter that supports Converged Enhanced Ethernet (CEE). Another embodiment of the system architecture 100 may include a multi-root I/O virtualization (MR-IOV) adapter. The network adapters 115 may further be used to implement a Fibre Channel over Ethernet (FCoE) protocol, RDMA over Ethernet, Internet small computer system interface (iSCSI), and the like. In general, a network adapter 115 transfers data using both an Ethernet and PCI based communication method and may be coupled to one or more of the virtual machines 111. In particular, Ethernet may be used as the protocol for the distributed network switch, while PCI may be used as the protocol to transfer data to/from main memory to the network adapter 115. Additionally, the adapters may facilitate shared access between the virtual machines 111. While network adapters 115 are shown as being included within the server 105, in other embodiments, the adapters may be physically distinct devices that are separate from the server 105.

As shown in FIG. 1, the second server 106 may include a processor 109 coupled to a memory 110 which includes one or more virtual machines 111 similar to those found in the first server 105. The memory 110 of server 106 may include a hypervisor 113 configured to manage data shared between different virtual machines 111. The hypervisor 113 may include a virtual bridge 114 that allows direct communication between connected virtual machines 111 rather than requiring the virtual machines 111 to use the bridge elements 120 or switching layer 130 to transmit data to other virtual machines 111 communicatively coupled to the hypervisor 113.

In one embodiment, each network adapter 115 may include a converged adapter virtual bridge (not shown) that facilitates data transfer between the network adapters 115 by coordinating access to the virtual machines 111. Each converged adapter virtual bridge may recognize data flowing within its domain (i.e., addressable space). A recognized domain address may be routed directly without transmitting the data outside of the domain of the particular converged adapter virtual bridge.

Each network adapter 115 may include one or more Ethernet ports that are coupled to one of the bridge elements 120, also referred to herein as bridging elements. Additionally, to facilitate PCIe communication, the server may have a PCI Host Bridge 117. The PCI Host Bridge 117 may connect to an upstream PCI port 122 on a switch element in the distributed network switch 180. The data is then routed via the switching layer 130 to the correct downstream PCI port 123 which may be located on the same or different switch module as the upstream PCI port 122. The data may then be forwarded to the PCIe device 152.

The distributed network switch 180 includes a plurality of bridge elements 120 that may be located on a plurality of a separate, though interconnected, hardware components. In one embodiment, the bridge elements 120 may be configured to forward data frames throughout the distributed network switch 180. The bridge elements 120 forward the data frames transmitted by the network adapter 115 to the switching layer 130. The bridge elements 120 may include a lookup table that stores address data used to forward the received data frames. For example, the bridge elements 120 may compare address data associated with a received data frame to the address data stored within the lookup table. Thus, the network adapters 115 do not need to know the network topology of the distributed network switch 180. From the perspective of the network adapters 115, the distributed network switch 180 acts like one single switch even though the distributed network switch 180 may be composed of multiple switches that are physically located on different components, such as on different chassis or racks. Distributing the operations of the network switch 180 into multiple bridge elements 120 provides redundancy in case of failure.

Each of the bridge elements 120 may be connected to one or more transport layer modules 125 that translate received data frames to the protocol used by the switching layer 130. For example, the transport layer modules 125 may translate data received using either an Ethernet or PCI communication method to a generic data type (i.e., a cell) that is transmitted via the switching layer 130 (i.e., a cell fabric). Thus, the switch modules comprising the distributed network switch 180 are compatible with at least two different communication protocols—e.g., the Ethernet and PCIe communication standards. That is, at least one switch module has the necessary logic to transfer different types of data on the same switching layer 130.

In one embodiment, the switching layer 130 may comprise a local rack interconnect (LRI) which connects bridge elements 120 located within the same chassis and rack, as well as links that connect to bridge elements 120 in other chassis and racks. After routing the cells, the switching layer 130 may communicate with transport layer modules 125 that translate the cells back to data frames that correspond to their respective communication protocols. A portion of the bridge elements 120 may facilitate communication with an Ethernet network 155 which provides access to a LAN or WAN (e.g., the Internet). Moreover, PCI data may be routed to a downstream PCI port 123 that connects to a PCIe device 152. The PCIe device 152 may be a passive backplane interconnect, as an expansion card interface for add-in boards, or common storage that can be accessed by any of the servers connected to the distributed network switch 180.

An Input/Output Management Controller (IOMC) 140 (i.e., a special purpose processor) is coupled to at least one bridge element 120 which provides the IOMC 140 with access to the switching layer 130. One function of the IOMC 140 may be to receive commands from an administrator to configure the different hardware elements of the distributed network switch 180. In one embodiment, these commands may be received from a separate switching network from the switching layer 130. Although one IOMC 140 is shown, the system architecture 100 may include a plurality of IOMCs 140. In one embodiment, IOMCs 140 may be arranged in a hierarchy such that one IOMC 140 is chosen as a master while the others are delegated as members. In another embodiment, the IOMCs 140 may be arranged in a peer-to-peer layout where the IOMCs 140 collaborate to administer and manage the elements of the distributed network switch 180.

In one embodiment, distributed network switch 180 may be configured to act as an FCF 150, which is a Fibre Channel switching element that is able to forward FCoE frames across one or more switch ports to connected endpoints (i.e., servers 105, 106, storage devices). One example of an FCoE Forwarder is further described in the Fibre Channel Backbone 5 (FC-BB-5) standard published by T11 working group of the International Committee for Information Technology Standards (INCITS). The IOMC 140 is depicted in FIG. 1 having an instance of a FCF 150 that manages execution of FCF functionality across the bridge elements 120 of the distributed network switch 180. In one embodiment, the FCF 150 may be a distributed FCF where a controlling FCF element provides FC services to a large number of endpoints through many intermediate switches. An example of a distributed FCF is shown in FIG. 2.

Figure 2:
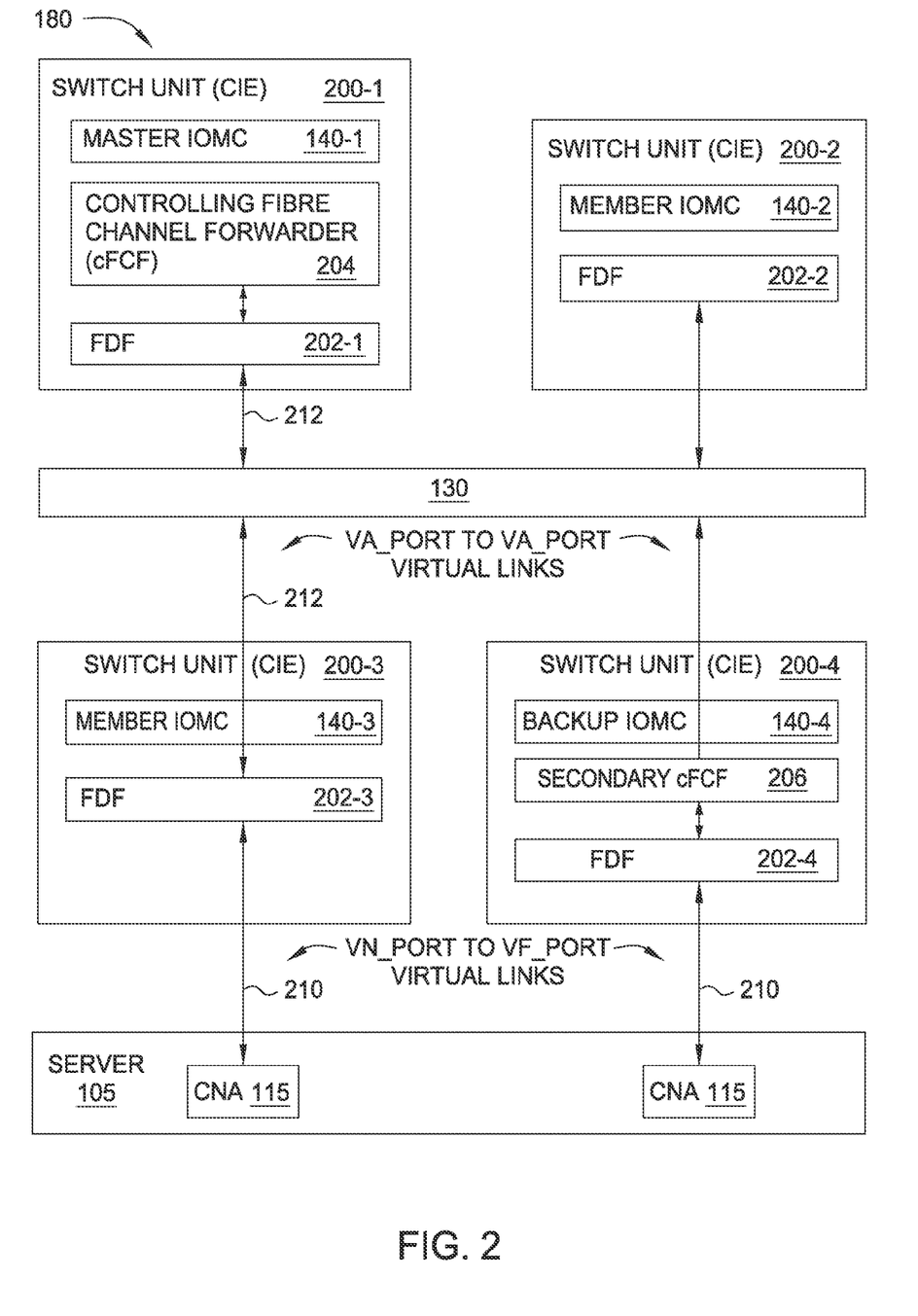
FIG. 2 illustrates the distributed network switch configured for Fibre Channel switching and having a Fibre Channel Data Forwarder and a controlling Fibre Channel Forwarder, according to one embodiment of the present disclosure.

FIG. 2 illustrates the distributed network switch 180 having a plurality of bridge elements 120 connected to the server 105, according to one embodiment of the present disclosure. As shown in FIG. 2, the bridge elements 120 are organized into a plurality of switch modules 200 (e.g., 200-1, 200-2, 200-3, and 200-4). The distributed network switch 180 disclosed herein is configured to provide distributed FCoE switching via multiple switch modules 200, the switching layer 130 interconnecting the switch modules 200, and management firmware executing on a management controller, e.g., IOMC 140.

A switch module 200 (sometimes referred to as a chassis interconnect elements or CIE) may be a physical switch unit configured to provide network bridging for the distributed network switch 180. In one embodiment, the switch modules 200 are hardware components (e.g., PCB boards, FPGA boards, system on a chip, etc.) that provide physical support and connectivity between the network adapters 115 and the bridge elements 120. Each switch module 200 may include a logical or physical grouping of bridge elements 120. Each bridge element 120 may be a distributed Virtual Ethernet bridge (dVEB) configured to forward data frames throughout the distributed network switch 180, including data frames comprising FCoE frames. In one embodiment, each bridge element 120 may have at least two ports, one port connecting to the switching layer 130 and another port connected to the servers 105 and 106 (e.g., via network adapters 115). The bridge elements 120 may forward data frames transmitted by the network adapter 115 to the switching layer 130. In one implementation, a network adapter 115 and bridge element 120 may be connected using two 40 Gbit Ethernet connections or one 100 Gbit Ethernet connection.

According to one embodiment, the distributed network switch 180 may be a distributed FCF having a set of FCoE Data Forwarders 202 (FDFs) associated with at least one controlling FCF (cFCF) 204, 206 that controls the operations of the set of FDFs. The cFCFs 204, 206 define a control plane for managing the distributed FCF and the FDFs 202 define a data plane for forwarding FCoE frames. The cFCFs and FDFs operate together to behave as a single distributed FCF such that a FCoE frame ingressing on a port in one switch module 200 may be routed to egress from a port in any other switch module 200. From an external point of view (i.e., from the perspective of the server 105), the distributed FCF behaves as an FCF. In particular, the distributed FCF supports instantiation of VN_Port to VF_Port virtual links 210 with ENode MAC addresses (i.e., CNAs 115), and instantiation of VE_Port to VE_Port virtual links (not shown) with FCF-MACs. A VN_Port is a Virtual N_Port and refers to a port in an Enhanced Ethernet node (ENode), and a VF_Port is a Virtual F_port a port in an FCoE-capable Ethernet switch. A VE_Port is a Virtual E_port and refers to an inter-switch link port. From an internal point of view (i.e., from the perspective of the FCF), the distributed FCF may instantiate VA_port to VA_port virtual links 212 to enable FCoE frame forwarding between the cFCFs 204, 206 and FDFs 202, as well as between FDFs 202. A VA_port is an instance of the FC-2V sublevel of Fibre Channel that connects to another VA_port, and which is dynamically instantiated together with an FCoE_LEP on successful completion of a FIP ELP Exchange. VA_port to VA_port virtual links 212 may also be used to exchange control information between cFCFs 204, 206 and FDFs 202, as described in greater detail later.

In one embodiment, each switch module 200 may instantiate a FDF 202, which are simplified FCoE switching entities that forward FC frames among ports through the distributed network switch 180. In one embodiment, a FDF 202 is a simplified FCoE switching element configured to forward FC frames among VA_ports and VF_ports through a Fibre Channel data-plane forwarder (FCDF) switching element. In some embodiments, an FDF 202 is functionally composed of a FCDF switching element with at least one Lossless Ethernet MAC (FDF-MAC), which may be physical or virtual ports of a switch module 200. The FDF 202 may support instantiation of VA_Ports and VF_Ports over its FDF-MACs.

In one embodiment, at least one of the switch modules 200 includes a primary controlling FCoE forwarder 204, 206 (sometimes referred to as a controlling FCF, or primary controlling switch, and hereafter cFCF). The cFCFs are configured to control and manage FDFs 202 to provide fabric services, through the FDFs 202 on each switch module 200, to all endpoints (e.g., server 105) connected to the switch ports. In the embodiment shown in FIG. 2, the switch modules 200 include a primary cFCF 204 that controls the FDFs 202, and a secondary cFCF 206 that synchronizes state with the primary cFCF 204 and is able to resume operation in case of failure of the primary cFCF 204. Examples of FDFs and cFCFs are described in the Fibre Channel Backbone-6 (FC-BB-6) and the Fibre Channel Switch Fabric 6 (FC-SW-6) standards published by T11 working group of the International Committee for Information Technology Standards (INCITS).

To operate as a single distributed fabric, each of the FCoE switching elements (i.e., FDFs, cFCFs) may share messages, such as Distributed Fibre Channel Forwarder Membership Distribution (DFMD), Active Zoning Access control list Distribution (AZAD), N_Port_ID and Zoning ACL Distribution (NPZD), Switch Fabric Internal Link Services (SW_ILS), and N_Port_ID Route Distribution (NPRD) among other messages. For an established distributed switch, the messages may include NPRD and NPZD messages, and in some cases AZAD messages, for establishing communication parameters between the switching elements. The FDF and cFCF may use the DFMD and NPRD messages for inter-switch communication between the FDFs and cFCFs. When an FCoE switching element (e.g. a FDF), falls out of synchronization with a controlling FCoE switching element (cFCF), the switching element may need to refresh the state of the FDF to re-synchronize the FDF with the cFCF. Accordingly, embodiments of the present disclosure provide a mechanism for synchronizing a cFCF 204 and a FDF 202 of a distributed Fibre Channel (e.g., FCoE) switch. In one embodiment, the FDF 202 suspends normal communications with attached devices and enters a recovery mode to exchange messages between the cFCF 204 for synchronizing the cFCF 204 and the FDF 202. The recovery mode enables the FDF 202 to synchronize its state with that of the cFCF without resetting the FDF 202 or deinstantiating the virtual link between the FDF and the cFCF, which may result in logging out any ENodes attached to the FDF 202. After the cFCF 204 and the FDF 202 are synchronized, the FDF 202 may leave the recovery mode and resume normal communications with attached devices.

Figure 3:
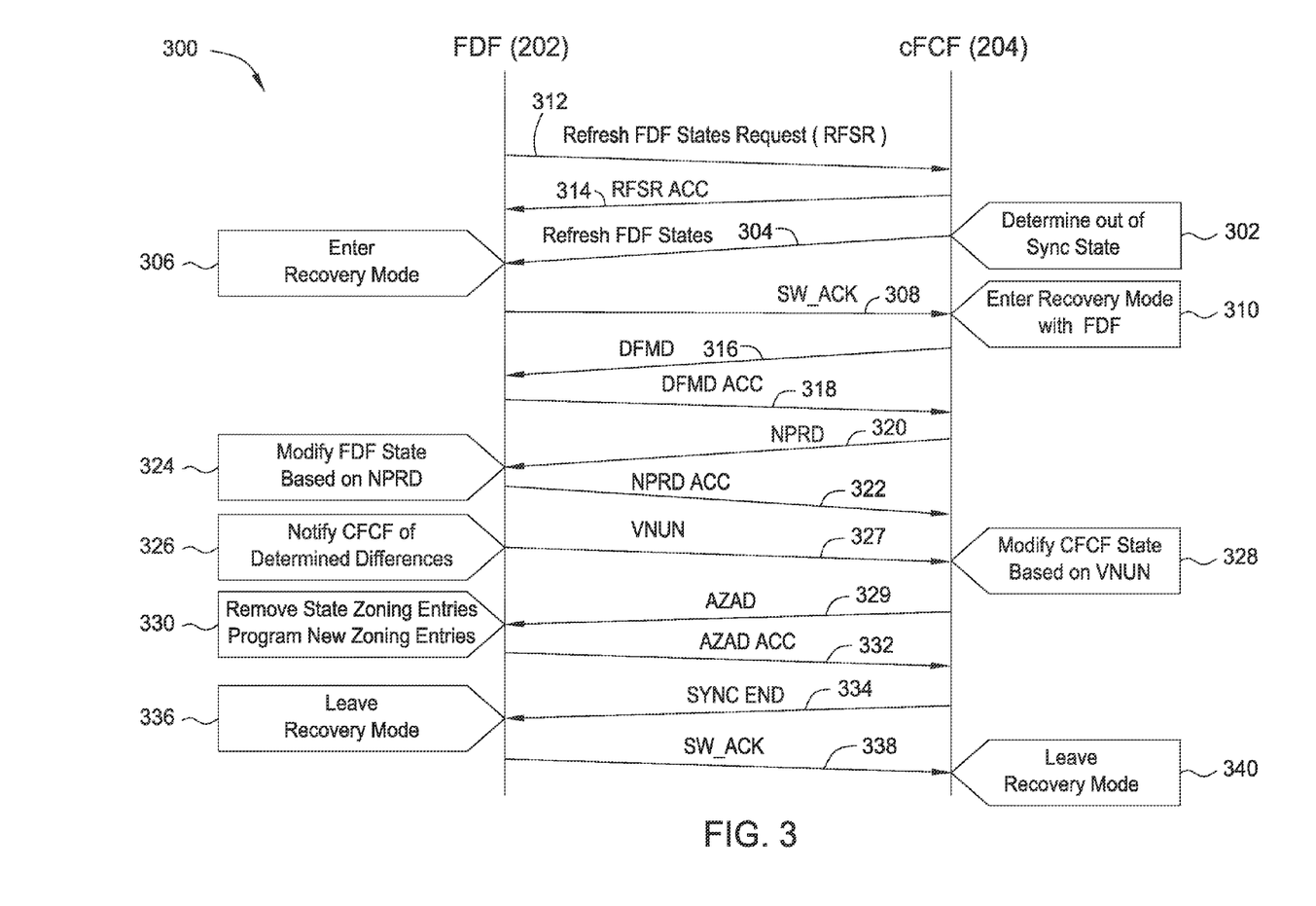
FIG. 3 is a sequence diagram illustrating operations performed and messages transmitted to synchronize a Fibre Channel Data Forwarder with a Controlling Fibre Channel Forwarder of distributed network switch, according to one embodiment of the present disclosure.

FIG. 3 is a sequence diagram illustrating operations performed and messages transmitted to synchronize a FDF 202 with a cFCF 204 of a distributed FCF, according to one embodiment of the present disclosure. As mentioned earlier, the FDF 202 may go out of sync with the cFCF 204 for a variety of reasons. For example, the distributed FCF may go out of sync from a loss of frames resulting in a loss of zoning updates (i.e. NPZD), a routing updates (i.e. NPRD) and fabric updates (i.e. DFMD). In another example, messages between the FDF 202 and the cFCF 204 may time out and the cFCF 204 may be unresponsive. In the example shown in FIG. 3, the FDF 202 may be undergoing a planned in-service-software-upgrade (ISSU) while events from other FDFs 505 might result in a fabric state change. Due to the downtime from the ISSU, the FDF 202 might not receive updates to the fabric state, resulting in an out of sync state.

At block 302, the cFCF 204 determines an out-of-sync state exists between the cFCF 204 and an FDF 202. In some embodiments, the cFCF 204 may declare an out-of-sync state exists with a particular FDF in response to user input (e.g., from a system administrator) indicating the particular FDF, or in other embodiments, the cFCF 204 itself detects the out-of-sync state.

At step 304, responsive to determining an out-of-sync state exists with the FDF 202, the cFCF 204 transmits to the FDF 202 a message, referred to herein as a Refresh FDF States message, which signals that the FDF 202 should enter into a recovery mode that allows the FDF 202 to re-synchronize the FDF's state with the cFCF 204. An example payload for the Refresh FDF States message is shown in Table 1 below.

TABLE 1

Example Refresh FDF States Format

| Item | Size (Bytes) |
| --- | --- |
| Switch Fabric Internal Link Services (SW_ILS) Code | 4 |
| Destination FDF Switch_Name | 8 |
| Originating Controlling Switch Switch_Name | 8 |
| Descriptor List Length | 4 |
| Reason Descriptor | See Table 2 Below |

In one embodiment, a Refresh FDF States message may include a SW_ILS code, a destination FDF switch name field, an originating controlling switch name field, and one or more reason descriptors. The SW_ILS code field of payload specifies a command code having a pre-assigned value that designates the message as a Refresh FDF States message. The destination FDF switch name identifies the destination FDF 202. The Originating Controlling Switch Switch_Name identifies the cFCF 204. The descriptor list length contains the length in bytes of the subsequent list of descriptors.

The Refresh FDF states message may include one or more reason descriptors, which provide information for managing and debugging the synchronization between the FDF 202 and cFCF 204, such as log messages arranged in a syslog format. The reason descriptor(s) may expand upon the SW-6 defined Reject descriptor and be reused as a reason descriptor. The reason code/explanation code may be context sensitive. In some embodiments, rather than change the behavior of the switch, the reason descriptor may be used for error and logging purposes, e.g., in a syslog. The format for the reason descriptor in shown below in Table 2.

TABLE 2

Example Reason Descriptor Format

| Item | Size (Bytes) |
| --- | --- |
| Tag Value = 000Eh | 4 |
| Length | 4 |
| Reserved | 1 |
| Reason Code | 1 |
| Reason Code Explanation | 1 |
| Vendor Specific | 1 |

In one embodiment, the Tag Value may have a pre-assigned value (e.g., hexadecimal code) corresponding to a Reason descriptor. In one embodiment, the reason code field may contain a value corresponding to pre-assigned textual description for the reason for rejection, such as those found in the T11 FC-BB-6 specification. The reason code explanation may contain additional bytes further expanding the reason code. For example, the reason code may correspond to text such as "Unable to perform command request" and have a reason explanation which corresponds to the text "Command already in progress". The codes may be context sensitive depending on which message contains the descriptor. For example, when contained in a Refresh FDF States message, the reason code and reason code explanation may be associated with reasons for an out-of-sync state, whereas when contained in other SW_ILS messages, these codes may be associated with reasons for message rejection.

At step 306, responsive to receiving the Refresh FDF States message, the FDF 202 enters a recovery mode that allows the FDF 202 to re-synchronize with the cFCF 204 without having to restart the FDF 202 or de-instantiate the virtual link between the FDF and the cFCF (which would otherwise result in all ENodes attached to the FDF 202 logging out of the fabric.) It is noted that, until receiving the Refresh FDF States message and entering the recovery mode, the FDF 202 remains fully operational, even if the FDF itself detects an out-of-sync state.

In one embodiment, when in the recovery mode, the FDF disallows any changes to its configuration caused by any attached ENodes. In some embodiments, the FDF may be configured to disallow login changes triggered by an ENode attached to the FDF, for example, by disabling Fabric Login (FLOGI) and Logout (LOGO) requests from attached ENodes over VN_Port to VF_Port virtual links 210. The FDF 202 may be configured to send a Link Service Reject (LS_RJT) response to all FLOGI/LOGO requests from devices connected to the fabric (e.g., ENodes) when in the recovery mode. The LS_RJT response sent by the FDF 202 may provide a "logical busy" reason for rejecting the request.

In one embodiment, when in the recovery mode, the FDF 202 disables checking for Keep Alive (KA) messages, which might otherwise cause the FDF to log out ENodes attached to the FDF. A KA message (e.g., a FIP Keep Alive Frame) is normally periodically transmitted by an ENode to another device, such as an FDF, to check the status of the VN_Port to VF_Port virtual link between the two. In some embodiments, when in the recovery mode, the FDF 202 may be configured to continue sending advertisement messages (e.g., multicast Discovery Advertisements) to any attached ENodes to prevent ENodes attached to the FDF 202 from logging out due to timeouts.

At step 308, responsive to receiving the Refresh FDF States message and entering recovery mode, the FDF 202 transmits an acknowledgement message (e.g., SW_ACK) to the cFCF 204. At block 310, the cFCF 204 enters a recovery mode in relation to the FDF 202, responsive to receiving the acknowledgement message from the FDF 202. It is noted that the recovery mode is associated with the particular FDF, that is, with the particular virtual link between the cFCF 204 and the FDF 202. The cFCF may continue to operate normally with respect to other FDFs connected to the cFCF 204, or in some cases, may be re-synchronizing with other FDFs at any given time. In one embodiment, when in the recovery mode, the cFCF may suspend normal messaging with the FDF 202, i.e., new updates resulting from changes in the fabric state by other events from other FDFs and embodied in NPRD, NPZD, AZAD messages. For example, an update between the FDF 202 and the cFCF 204 triggered by a logout of an ENode by another FDF in the fabric may be suspended or suppressed.

In some cases, the synchronization process may be initiated by the FDF 202, rather than by the cFCF (i.e., administrator). In one embodiment, the FDF 202 may detect an out of sync state and transmit to the cFCF 204 a message, referred to herein as a Refresh FDF States Request message, requesting the cFCF 204 to initiate the synchronization process. This optional step is depicted in FIG. 3 as step 312. The Refresh FDF States Request message may have a format similar to the Refresh FDF States message described earlier. In response to the Refresh FDF States Request message, the cFCF 204 may transmit an acceptance message (i.e., RFSR ACC) or an acknowledgment message (SW_ACK) to the FDF 202, and proceed to transmit the Refresh FDF States messages (as described in step 304). In some cases, the cFCF 204 may transmit a rejection message (SW_RJT) indicating the cFCF 204 is declining to initiate the synchronization process. In such cases, the FDF 202 might simply de-instantiate the virtual link with the cFCF and start over.

While in the recovery mode, the cFCF 204 transmits a plurality of messages to the FDF 202 describing a state for a plurality of connections at the cFCF 204 with respect to the FDF 202. The FDF 202 in turn modifies its configuration to synchronize with the state of the distributed FCF based on one or more messages provided by the cFCF 204, including Distributed Switch Membership Distribution (DFMD) messages, N_Port_ID Route Distribution (NPRD) messages, and Active Zoning ACL Distribution (AZAD) messages.

At step 316, the cFCF 204 transmits a DFMD message to the FDF 202, which communicates the Fabric Name, the identities of the Primary and Secondary cFCF and all the FDFs that comprise the distributed FCF switch. The FDF 202 receives the DFMD message sent by the cFCF 204, and updates its configuration to reflect the information contained within the DFMD, including the Fabric Name, the identities of the Primary and Secondary cFCF, and all the FDFs that comprise the distributed FCF. For example, the FDF 202 may update its configuration to add a peer FDF (identified in the DFMD) that was previously unknown to the FDF 202 due to the FDF's out of sync state. In another example, the FDF 202 may update its configuration remove any peer FDFs not identified in the DFMD but was previously believed to be part of the fabric due to the FDF's out of sync state.

At step 318, the FDF 202 acknowledges receipt of the DFMD from the cFCF 204 by transmitting an accept message (i.e., DFMD_ACC) or a rejection message (i.e., DFMD_RJT) to the cFCF 204. The DFMD_RJT may be sent to the cFCF 204 when the FDF 202 has been informed of the primary cFCF failover and contains a reason code that causes the FDF 202 to clear the virtual link (CVL) with the primary cFCF. Alternately, the DFMD_RJT sent by the FDF 202 may request a resend of the DFMD by the cFCF 204 or cancel the synchronization process of the cFCF 204.

At step 318, the cFCF 204 transmits to the FDF 202 an N_Port_ID Route Distribution (NPRD) message which communicates routing information for the distributed switch. In a distributed FCF switch, all information handling is performed by the primary cFCF 204. Therefore, the FDF 202 receives all address identifiers from the primary cFCF through a VA_Port. The NPRD provides to the FDF 202 the routing information needed to reach the attached cFCFs and FDFs. The NPRD contains the domain controller address identities, i.e. Fibre Provided MAC Addresses (FPMAs), as well as path and hop information for routing packets between FDFs and cFCFs of the distributed switch. In some embodiments, the NPRD message may be prepared with the FPMAs present in the local hardware table of the cFCF 204. At step 320, the FDF 202 may transmit a message (i.e., NPRD ACC) indicating acceptance of the NPRD Request Sequence for processing.

At block 324, responsive to receiving the NPRD message, the FDF 202 may be modified based on the NPRD message received from the cFCF 204. In one embodiment, the FDF 202 newly registers any FPMAs provided in the NPRD at a local hardware table on the FDF 202. In one embodiment, any VN_Ports known to the FDF 202 which are missing from the received NPRD are logged off at the FDF 202. As such, the FDF 202 de-instantiates virtual links established to those ENodes corresponding to the missing VN_Ports and transmits a CVL command to the ENode. It is noted that a VN_Port Unreachability Notification (VNUN) exchange to report to the cFCF that the VN_Ports have been logged out may not be necessary because it may be inferred from the NPRD that the cFCF 204 is unaware of those VN_Ports.

At block 326, the FDF 202 notifies the cFCF 204 of differences between the FPMAs supplied by the NPRD with the FPMAs known by the FDF 202. This notification ensures that the cFCF 204 is calculating and determining control information, such as routing information and zoning, according to an accurate information about the state of the distributed FCF.

In one embodiment, the FPMAs in the NPRD which are not known by the FDF 202 are removed from the cFCF 204. In response to determining that an N_Port_ID, or associated FPMA, mentioned in the NPRD is unknown, the FDF 202 transmits a VNUN message to the cFCF 204 to notify the cFCF 204 of the discrepancy (depicted as step 327). The VNUN message, which is typically used by the FDF 202 to communicate to the Primary cFCF 204 that one or more of its VN_Ports may have been logged out, is used to communicate to the Primary cFCF 204 that one or more of the VN_Ports supplied in the NPRD is unknown. In some embodiments, the FDF 202 transmits a VNUN message having an Unreachable N_Port_ID field that identifies the N_Port_ID associated with the unknown FPMA. An example for the VN_Port Unreachability Descriptor is shown in Table 3 below.

TABLE 3

Example VN_Port Unreachability Descriptor Format

| Item | Size (Bytes) |
|---|---|
| Tag Value = 0003h | 4 |
| Length = 20 | 4 |
| Flags | 1 |
| Unreachable N_Port_ID | 3 |
| Unreachable N_Port_Name | 8 |
| F_Port_Name | 8 |

At step 328, the cFCF 204 may receive a message from the FDF 202 indicating one or more connections in the NPRD are unknown or unreachable by the FDF 202. The cFCF 204 may receive from the FDF 202 a VNUN listing for an N_Port_ID of the ENode in the NPRD to get the cFCF 204 in sync with the FDF 202. The VNUN communicates to the cFCF 204 one or more of the VN_Ports needed to be cleared at the cFCF 204. In one embodiment, the cFCF de-allocates one or more FPMAs based on the received message indicating one or more connections are unknown to the FDF.

It is noted that since the N_Port_Name is not included in the NPRD, the FDF 202 in recovery mode may be unaware of this information, and may be unable to transmit a traditional well-formed VNUN message as a result. According to one embodiment, the cFCF 204 may be configured to ignore the N_Port_Name field in a VNUN message when in the recovery mode. In another embodiment, a VN_Port Unreachability Descriptor in the VNUN request payload may be utilized to signal the cFCF 204 to ignore the N_Port_Name. A flag may be set in the Flags field to indicate that the N_Port_Name field may be empty.

At step 329, the cFCF 204 transmits an Active Zoning Access control list Distribution (AZAD) message to the FDF 202, which communicates to the FDF 202 the zoning Access Control List (ACL) information when a new zone set is activated in the fabric. At block 332, upon receiving an AZAD, the FDF 202 removes all stale zoning entries. Additionally, the FDF 202 programs new zoning entries into the zoning ACL, i.e. enforcement of authorized connections according to the received zoning ACLs. At step 332, the FDF 202 transmits a message (i.e., AZAD ACC) indicating acceptance of the AZAD message for processing and the completion of the synchronization for the zoning ACLs between the cFCF 204 and FDF 202.

While the present disclosure describes synchronizing the FDF using DFMD messages, NPRD messages, AZAD messages, it should be recognized that other messaging between the FDF 202 and cFCF 204 may be used to synchronize the states of the FDF and the cFCF. For example, in some embodiments, the FDF may be altered its zoning entries based on a message (e.g., NPZD) received from the cFCF as well. It should be further recognized that embodiments of the present disclosure may use messaging between the FDF and the cFCF in other orders and sequencing than provided herein.

At step 334, the cFCF 204 transmits to the FDF 202 a "sync end" message indicating the synchronization process has been completed. At block 336, responsive to receiving the sync end message from the cFCF 204, the FDF 202 leaves the recovery mode. In one embodiment, the FDF 202 may update (i.e., effectively speed up) the keep-alive timestamp to the current time and re-enable keep-alive checking.

At step 338, the FDF 202 transmits a refresh FDF state acceptance message (depicted as a SW_ACK) to the cFCF 204, confirming the completion of the synchronization of the cFCF 204 with the FDF 202. At block 340, upon receipt of the SW_ACK to the sync end message, the cFCF 204 leaves the recovery mode with respect to the FDF 202. The cFCF 204 may resume normal communication with the FDF 202 and may update the FDF 202. Since the FDF has been unaware of state changes in the fabric while the FDF was in recovery mode, the FDF 202 may be updated by the cFCF 204 to account for FLOGI/LOGO on other FDFs and other changes, while the FDF 202 was in recovery mode. For example, the cFCF 204 may transmit to the FDF 202 a new NPRD, NPZD and AZAD reflecting changes to the state of the fabric that occurred while the synchronization process has been performed.

Figure 4:
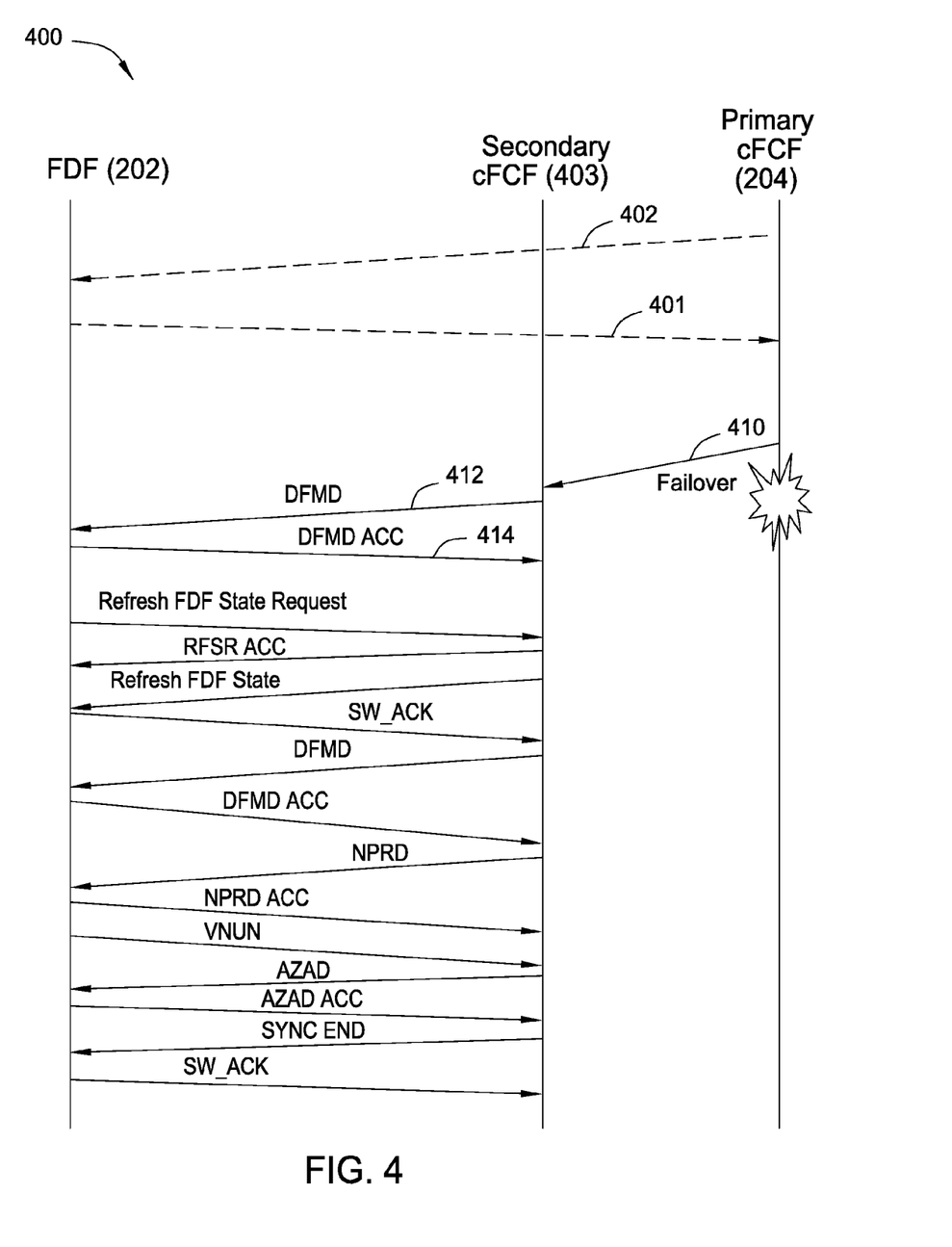
FIG. 4 is a sequence diagram illustrating operations performed and messages transmitted between Fibre Channel Data Forwarder and a Controlling Fibre Channel Forwarder during a failover while synchronizing the distributed network switch, according to one embodiment of the present disclosure.

FIG. 4 is a sequence diagram illustrating operations 400 performed and messages transmitted between the FDF 202 and cFCFs during a failover while synchronizing the distributed network switch, according to one embodiment of the present disclosure. In a distributed switch, a primary cFCF 204 defines the routes for the FDF topology and performs N_Port_ID allocations and deallocations for all its controlled FDFs. The primary cFCF 204 and a secondary cFCF 403 present in the distributed switch may keep their state synchronized via a redundancy protocol. The cFCFs 204, 403 may have a down timer which resets every time a KA request from the cFCF is received. When the down timer exceeds a threshold, a failover, or transition from the primary cFCF 204 to the secondary cFCF 403 occurs and the secondary cFCF 403 replaces the primary cFCF 204 as the primary controlling element. The expiration of the down timer signifies to the secondary cFCF 603 that the primary cFCF 204 is no longer part of the fabric topology (i.e., the primary cFCF 204 is no longer available).

In the operations 400 in FIG. 4, the primary cFCF 204 and the FDF 202 may be communicating during a recovery mode, as depicted by dashed arrows 401 and 402. An event may occur which causes a failover from the primary cFCF 204 to the secondary cFCF, as shown by arrow 410. As part of the failover sequence, at step 412, the secondary cFCF 403 transmits to the FDF 202 a DFMD message declaring itself as the (new) primary controlling switch. In response, at step 414, the FDF 202 transmits an acceptance message (i.e., DFMD ACC) acknowledging receipt of the DFMD message.

In one embodiment, the FDF 202 is configured to restart the recovery mode process in case of a failover between cFCFs 204, 403 that occurs during the recovery mode with cFCF 204. That is, the FDF 202 may restart the recovery mode process in response to receiving a DFMD while communicating with one cFCF (i.e., cFCF 204) in recovery mode, which indicates a different cFCF (i.e., cFCF 403) is the primary controlling switch. In one embodiment, the FDF 202 transmits a Refresh FDF States Request message which signals the cFCF 403 to restart the synchronization process. The Refresh FDF States Request message may include a Reason Descriptor indicating the synchronization has been restarted due to a failover from another cFCF (e.g., via reason code and reason explanation codes described above.) As shown in FIG. 4, the operations 400 proceed similarly to the operations 300 described in conjunction with FIG. 3, except in this case the FDF 202 is synchronizing its state with the backup cFCF 403.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the present disclosure may be devised without departing from the basic scope thereof, and the scope thereof is determined by the claims that follow.

What is claimed is:

1. A method for managing a Distributed Fibre Channel Switch, the method comprising:
   responsive to determining a Fibre Channel Data Forwarder (FDF) is out of sync with a controlling Fibre Channel Forwarder (cFCF), entering a recovery mode at the FDF;
   modifying the FDF based on a route distribution message received from the cFCF, wherein the route distribution message includes fabric-provided MAC addresses (FPMAs) provided by the cFCF;
   notifying the cFCF of differences between the FPMAs supplied by the route distribution message and the FPMAs known by the FDF; and
   leaving the recovery mode at the FDF and sending an acknowledgement to the cFCF.

2. The method of claim 1, wherein the recovery mode is entered in response to receiving a Refresh FDF States message from the cFCF signaling the FDF to enter the recovery mode.

3. The method of claim 1, further comprising:
   transmitting to the cFCF a Refresh FDF States Request message signaling the cFCF to start a synchronization process.

4. The method of claim 1, wherein entering the recovery mode comprises:
   disabling FDF Fabric login request and Fabric logout request;
   disabling keep alive (KA) checking; and
   sending KA messages to ENodes to prevent the ENodes from logging out due to timeouts.

5. The method of claim 1, wherein modifying the FDF based on the route distribution message received from the cFCF comprises:
   registering the FPMAs in the route distribution message with a hardware table in the FDF.

6. The method of claim 1, wherein modifying the FDF based on the route distribution message received from the cFCF comprises:
   clearing virtual links to ENodes attached to the FDF which are associated with VN_Ports determined to be missing in the route distribution message.

7. The method of claim 1, wherein notifying the cFCF of differences between the FPMAs supplied by the route distribution message with the FPMAs known by the FDF further comprises:
   determining one or more FPMAs specified by the route distribution message and unknown to the FDF; and
   transmitting a VN_Port Unreachability Notification (VNUN) message to the cFCF indicating the one or more FPMAs.

8. The method of claim 1, further comprising:
   receiving by the FDF an Active Zoning Access control list Distribution (AZAD) from the cFCF;
   removing all stale zoning entries based on the received AZAD; and
   programming new zoning entries based on the received AZAD.

9. The method of claim 1, further comprising:
   responsive to receiving a Distributed Fibre Channel Forwarder Membership Distribution (DFMD) from a second cFCF, wherein the DFMD indicates the second cFCF is a primary controlling element, transmitting a Refresh FDF States Request message to the second cFCF signaling the second cFCF to restart a synchronization process.

* * * * *